(12) United States Patent
Abram et al.

(10) Patent No.: US 11,117,439 B2
(45) Date of Patent: Sep. 14, 2021

(54) COOLING SYSTEM FOR ELECTRIC VEHICLE AXLE

(71) Applicant: DAIMLER AG, Stuttgart (DE)

(72) Inventors: Pete Abram, Portland, OR (US); Lokesh Pandey, Udaipur Rajastan (IN); Hemant Gull, Bangalore Karnataka (IN); Nikita Timofeev, Portland, OR (US)

(73) Assignee: DAIMLER AG, Stuttgart (DE)

( * ) Notice: Subject to any disclaimer, the term of this patent is extended or adjusted under 35 U.S.C. 154(b) by 181 days.

(21) Appl. No.: 16/692,176

(22) Filed: Nov. 22, 2019

(65) Prior Publication Data
US 2021/0155072 A1    May 27, 2021

(51) Int. Cl.
| | | |
|---|---|---|
| *B60L 50/50* | (2019.01) | |
| *B60H 1/00* | (2006.01) | |
| *B60H 1/32* | (2006.01) | |
| *B60K 1/02* | (2006.01) | |
| *B60G 9/02* | (2006.01) | |
| *B60K 11/02* | (2006.01) | |
| *B60H 1/22* | (2006.01) | |
| *B60K 1/00* | (2006.01) | |

(52) U.S. Cl.
CPC ........... *B60H 1/00271* (2013.01); *B60G 9/02* (2013.01); *B60H 1/3228* (2019.05); *B60K 1/02* (2013.01); *B60K 11/02* (2013.01); *B60L 50/50* (2019.02); *B60G 2204/4306* (2013.01); *B60H 2001/00307* (2013.01); *B60H 2001/2278* (2013.01); *B60K 2001/006* (2013.01); *B60Y 2200/91* (2013.01)

(58) Field of Classification Search
CPC .............. B60H 1/00271; B60H 1/3228; B60H 2001/00307; B60H 2001/2278; B60L 50/50; B60G 9/02; B60G 2204/4306; B60K 1/02; B60K 11/02; B60K 2001/006; B60Y 2200/91
See application file for complete search history.

(56) References Cited

U.S. PATENT DOCUMENTS

2006/0158024 A1    7/2006    Wendl
2017/0175612 A1    6/2017    Tokozakura et al.

FOREIGN PATENT DOCUMENTS

DE    102013204766 A1    9/2014

*Primary Examiner* — James A Shriver, II
*Assistant Examiner* — Michael T. Walsh
(74) *Attorney, Agent, or Firm* — Patent Portfolio Builders PLLC

(57) ABSTRACT

An electric vehicle includes a chassis, a rigid axle housing, and a suspension system control arm coupling the rigid axle housing to the chassis. The electric vehicle also includes first and second electric motors, each having a rotator and a stator. The stator of the first and second electric motors are rigidly fixed to the rigid axle housing. The electric vehicle also includes a coolant supply system coupled to a radiator and the rigid axle housing to supply coolant from the radiator to a coolant inlet of the rigid axle housing and to supply used coolant from a coolant outlet of the rigid axle housing to the radiator. A first mounting bracket is fixed to the chassis and the coolant supply system. A second mounting bracket is fixed to the rigid axle housing and the coolant supply system, and a third mounting bracket is fixed to the control arm and the coolant supply system.

13 Claims, 3 Drawing Sheets

COOLING SYSTEM FOR ELECTRIC VEHICLE AXLE

BACKGROUND OF THE INVENTION

Exemplary embodiments of the present invention relate to a coolant supply system for an electric vehicle axle, and more specifically to the connection of the coolant supply system to the electric vehicle and the electric vehicle axle.

Many electric vehicles include electric motors arranged on the ends of the axles of the vehicle, which allows the electric motors to directly drive the wheels attached to the axles. The electric motors, as well as associated bearings and gearings, generate a large amount of heat, which if not properly dissipated, can reduce operational lifetime and/or cause failure of the electric motors, associated bearings, and/or gearings.

One solution for addressing this heating issue is to provide a cooling system that is coupled to the axle so as to cool the electric motor, associated bearings, and/or gearing. The coolant supply system can include supply and return lines for moving a coolant between a radiator and the axle. Because the axle is typically attached to the vehicle chassis via a suspension system, the axle and the vehicle chassis can move in opposing directions towards or away from each other. In order to accommodate the movement of the axle and vehicle chassis away from each other, the supply and return lines are dimensioned so that the lines can extend at least between a maximum displacement between the axle and vehicle chassis. However, this additional length of the supply and return lines can become problematic when the axle and vehicle chassis move towards each other because these lines can be kinked during this movement. The kinking can reduce the coolant supply to the axle and/or the return of coolant from the axle to the coolant supply tank. The reduction in the supply and/or return of coolant to/from the axle can result ineffective cooling of the electric motors, associated bearings, and gearings, which can decrease the lifetime of these components, and in some cases lead to component failure.

Accordingly, it would be desirable to provide a way to couple a coolant supply system to an axle of an electric vehicle that avoids kinking of the supply and return lines.

The present invention is explained below in more detail by means of embodiments with reference to the enclosed drawings in which identical or corresponding parts are referred to with the same reference numerals consistently throughout the several views.

SUMMARY OF THE INVENTION

According to an embodiment, an electric vehicle includes a chassis, a rigid axle housing, and a suspension system control arm coupling the rigid axle housing to the chassis. First and second electric motors are rigidly fixed to the rigid axle housing, each having a rotator and a stator. The stator of the first and second electric motors is rigidly fixed to the rigid axle housing. The electric vehicle also includes a coolant supply system coupled to a radiator and the rigid axle housing to supply coolant from the radiator to a coolant inlet of the rigid axle housing and to supply used coolant from a coolant outlet of the rigid axle housing to the radiator. A first mounting bracket is fixed to the chassis and the coolant supply system. A second mounting bracket is fixed to the rigid axle housing and the coolant supply system, and a third mounting bracket is fixed to the control arm and the coolant supply system.

According to another embodiment, there is a method for installing a coolant supply system in an electric vehicle. The coolant supply system is coupled to a radiator and a rigid axle housing of the vehicle so that the coolant supply system is configured to supply coolant from the radiator to a coolant inlet of the rigid axle housing and to supply used coolant from a coolant outlet of the rigid axle housing to the radiator. A first mounting bracket is fixed to the chassis and the coolant supply system. A second mounting bracket is fixed to the rigid axle housing and the coolant supply system. A third mounting bracket is fixed to a suspension system control arm and the coolant supply system. The coupling of the coolant supply system and the fixing of the first, second, and third mounting brackets can be performed in any order.

The present invention is explained below in more detail by means of embodiments with reference to the enclosed drawings in which identical or corresponding parts are referred to with the same reference numerals consistently throughout the several views.

BRIEF DESCRIPTION OF THE DRAWING FIGURES

DETAILED DESCRIPTION

Figure 1:
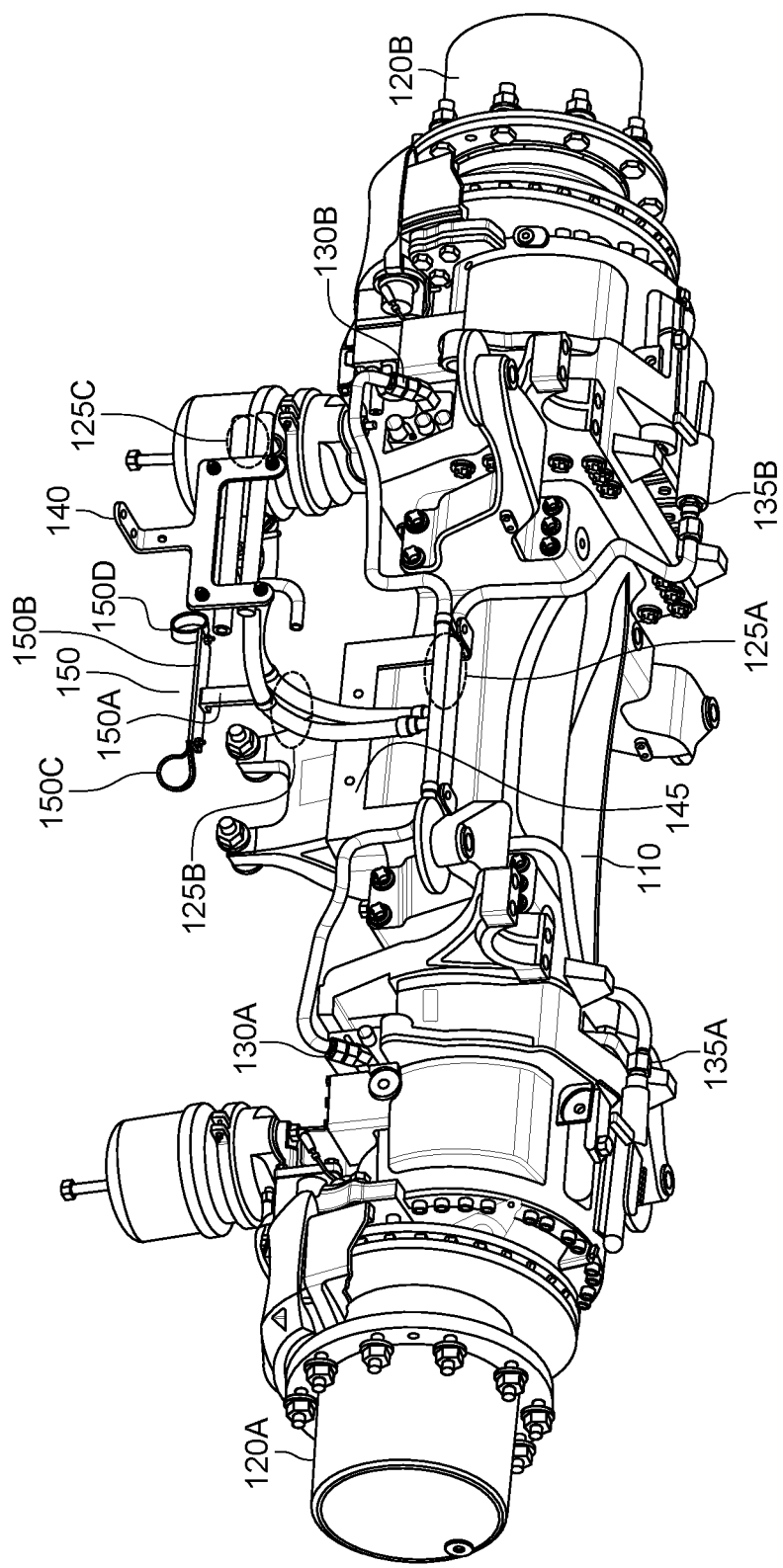
FIG. 1 is a schematic diagram of an electric vehicle axle according to embodiments.

Exemplary embodiments will now be described in connection with FIGS. 1 and 2. As illustrated, an electric vehicle includes a chassis 105, a rigid axle housing 110, and a suspension system control arm 115 coupling the rigid axle housing 110 to the chassis 105. The axle used with electric motors is commonly referred to as an electric axle (as well as an e-axle) because the axle is designed and configured such that it is electrically driven. Thus, all references herein to an axle should be understood as referring to an electric axle (or e-axle), as well as all references to the axle housing should be understood as referring to an electric axle (or e-axle) housing. The electric vehicle also includes first 120A and second 120B electric motors, each having a rotator and a stator (not illustrated). The stator of the first 120A and second 120B electric motors is rigidly fixed to the rigid axle housing 110. The rigid fixation of the stator to the rigid axle housing 110 is not illustrated in the figures for purposes of clarity, however this type of rigid fixation is well-known in the art. The electric vehicle further comprises a coolant supply system 125A, 125B, 125C coupled to a radiator (not illustrated) and the rigid axle housing 110 to supply coolant from the radiator to a coolant inlet 135A, 135B of the rigid axle housing 110 and to supply used coolant from a coolant outlet 130A, 130B of the rigid axle housing 110 to the radiator. A first mounting bracket 140 is fixed to the chassis 105 and the coolant supply system 125. A second mounting bracket 145 is fixed to the rigid axle housing 110 and the coolant supply system 125. A third mounting bracket 150 fixed to the control arm 120 and the coolant supply system 125.

The third mounting bracket 150 is configured to move with the control arm 115 independent of movement of the rigid axle housing 110, which avoids kinking of the coolant supply system due to differing movements of the rigid axle housing 110 and the chassis 105. Specifically, as particularly illustrated in FIG. 2, the third mounting bracket 150 is directly coupled to the control arm 115 but is not directly coupled to the rigid axle housing 110. Instead, the third mounting bracket is coupled directly to hoses 125B of the coolant supply system. This allows the hoses 125B to move along with the chassis 105 so that any compression between the chassis 105 and rigid axle housing 110 does not result in kinking of these hoses 125B.

Figure 2:
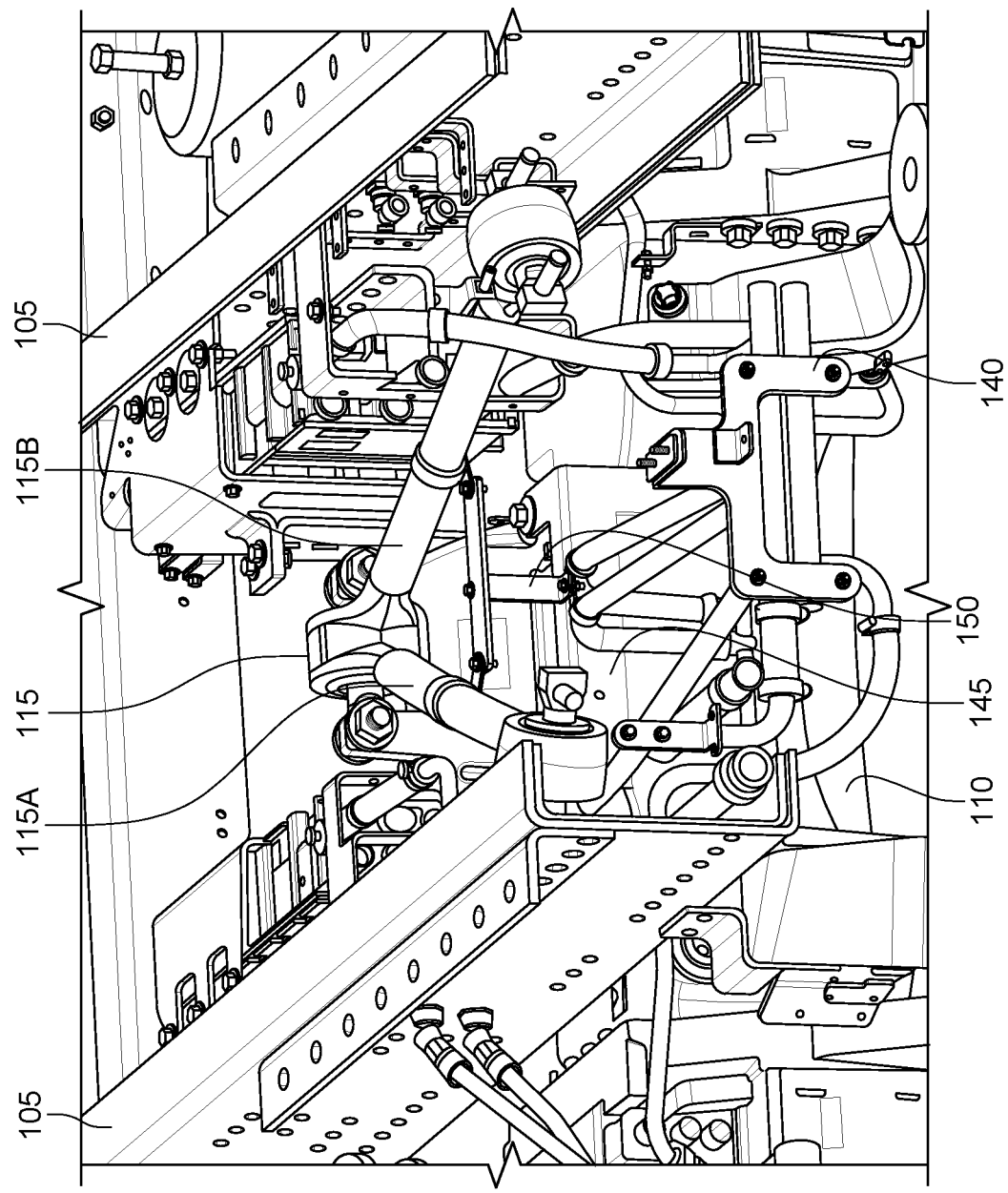
FIG. 2 is a schematic diagram of a portion of an electric vehicle axle housing affixed to a vehicle chassis according to embodiments.

As also illustrated in FIG. 2, the third mounting bracket 150, in a transverse direction of the chassis 105, is arranged in a central region of the chassis 105. Further, the second mounting bracket 145, in a transverse direction of the chassis 105, is arranged in a central region of the chassis 105.

In the illustrated embodiment, the control arm 115 is a v-shaped control arm having first 115A and second 115B control arms. The third mounting bracket 150 is rigidly fixed to the first 115A and second 115B control arms.

As illustrated in FIGS. 1 and 2, the third mounting bracket 150 is t-shaped with a vertical portion 150A connected to the coolant supply system 125A, 125B, 125C and to a horizontal portion 150B. The horizontal portion 150B of the third mounting bracket 150 is rigidly fixed to the first 115A and second 115B control arms. Further, first 150C and second 150D loop-shaped connectors (also known as p-clamps) encircle a portion of the coolant supply system and are fixed to the horizontal portion 150B of the third mounting bracket 150.

The coolant supply system comprises first and second branching lines 125A arranged in parallel to the rigid axle housing 110. The first and second branching lines 125A are rigidly fixed to the rigid axle housing 110 by the second mounting bracket 145. The coolant supply system also includes first and second flexible hoses 125B that are rigidly fixed to the third mounting bracket 150. The first and second hoses 125B are respectively coupled to the first and second branching lines 125A. Further, the coolant supply system includes first and second manifolds 125C, which couple the first and second flexible hoses 125B with the first and second branching lines 125A.

As will be appreciated from FIG. 1, the first and second branching lines are connected to coolant inlets and outlets on the rigid axle housing 110. Specifically, the coolant inlet 135A, 135B includes a first coolant inlet 135A arranged proximate to the first electric motor 120A and a second coolant inlet 135B arranged proximate to the second electric motor 120B. Similarly, the coolant outlet 130A, 130B includes a first coolant outlet 130A arranged proximate to the first electric motor 120A and a second coolant outlet 130B arranged proximate to the second electric motor 120B.

The coupling of the coolant outlets 130A, 130B to the radiator can involve passing the used coolant through a heat-dissipation structure, such as a heat exchanger prior to returning the used coolant back into the axle housing.

Figure 3:
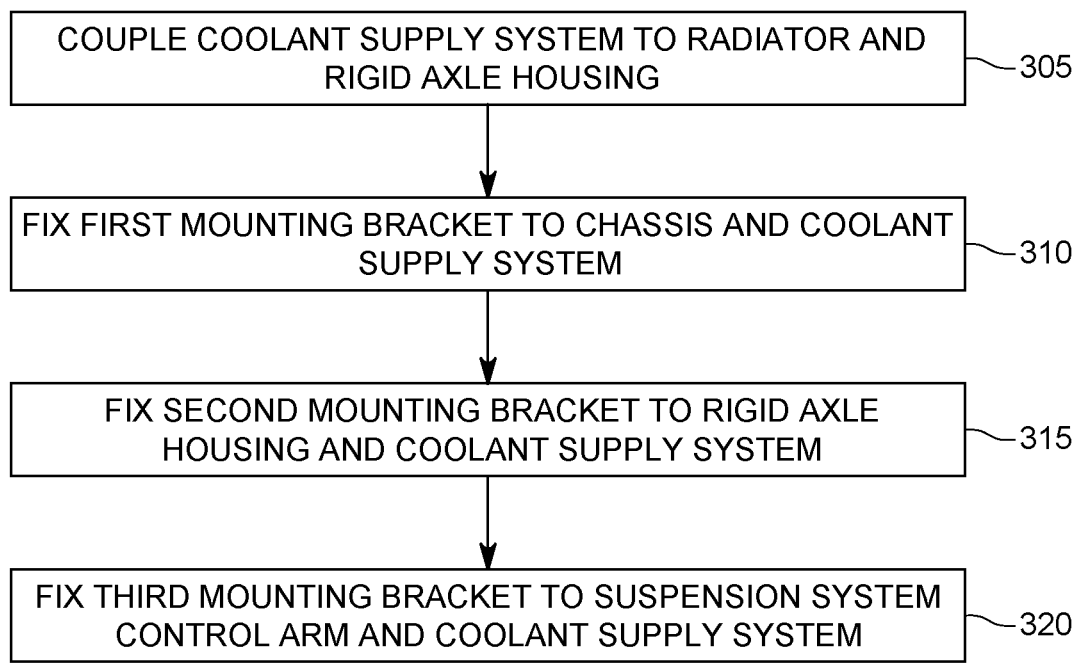
FIG. 3 is a flow diagram of a method of installing a coolant supply system in an electric vehicle according to embodiments.

Turning now to FIG. 3, which is a flowchart of a method for installing a coolant supply system 125A, 125B, 125C in an electric vehicle. The coolant supply system 125A, 125B, 125C is coupled to a radiator via a manifold and a rigid axle housing 110 of the vehicle so that the coolant supply system is configured to supply coolant from the radiator to a coolant inlet 135A, 135B of the rigid axle housing 110 and to return coolant from a coolant outlet 130A, 130B of the rigid axle housing 110 to the radiator (step 305). A first mounting bracket 140 is fixed to the chassis 105 and the coolant supply system 125 (step 310). A second mounting bracket 145 is fixed to the rigid axle housing 110 and the coolant supply system 125 (step 315). A third mounting bracket 150 is fixed to a suspension system control arm 120 and the coolant supply system 125 (step 320). It should be recognized that the steps of the method need not be performed in the order in which they are described in connection with FIG. 3. For example, the first 140, second 145, and third 150 mounting brackets can be fixed in any order. Further, the mounting brackets can be fixed first (steps 310-320) and then the coolant supply system 125A, 125B, 125C can be coupled to the radiator and the rigid axle housing 110 (step 305).

As discussed above, in an embodiment the control arm 115 has first 115A and second 115B control arms, the third mounting bracket 150 is t-shaped with a vertical portion 150A connected to the coolant supply system 125A, 125B, 125C and to a horizontal portion 150B. In this case, the method can further involve rigidly fixing the horizontal portion 150B of the third mounting bracket 150 to the first 115A and second 115B control arms. First 150C and second 150D loop-shaped connectors can then be fixed to the horizontal portion 150B of the third mounting bracket 150. A portion of coolant supply system can then be secured with the first 150C and second 150D loop-shaped connectors on a portion of the coolant supply system.

As will be appreciated from the discussion above, the present invention significantly improves the use of a coolant supply system in electric vehicles. Specifically, by fixing the third mounting bracket to the suspension system control arm and to the coolant supply system, the lines of the coolant supply system move along with the vehicle chassis relative to the rigid axle housing, thus avoiding kinking of these lines that otherwise would occur without this third mounting bracket.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

What is claimed is:

1. An electric vehicle, comprising:
    a chassis;
    a rigid axle housing;
    a suspension system control arm coupling the rigid axle housing to the chassis;
    first and second electric motors, each having a rotator and a stator, wherein the stator of the first and second electric motors are rigidly fixed to the rigid axle housing;
    a coolant supply system coupled to a radiator and the rigid axle housing to supply coolant from the radiator to a coolant inlet of the rigid axle housing and to supply used coolant from a coolant outlet of the rigid axle housing to the radiator;

a first mounting bracket fixed to the chassis and the coolant supply system;

a second mounting bracket fixed to the rigid axle housing and the coolant supply system; and a third mounting bracket fixed to the control arm and the coolant supply system.

2. The electric vehicle of claim 1, wherein the third mounting bracket is configured to move with the control arm independent of movement of the rigid axle housing.

3. The electric vehicle of claim 1, wherein, in a transverse direction of the chassis, the third mounting bracket is arranged in a central region of the chassis.

4. The electric vehicle of claim 1, wherein, in a transverse direction of the chassis, the second mounting bracket is arranged in a central region of the chassis.

5. The electric vehicle of claim 1, wherein the control arm has first and second control arms and the third mounting bracket is rigidly fixed to the first and second control arms.

6. The electric vehicle of claim 5, wherein the third mounting bracket is t-shaped with a vertical portion connected to the coolant supply system and to a horizontal portion, wherein the horizontal portion is rigidly fixed to the first and second control arms.

7. The electric vehicle of claim 6, further comprising:

first and second loop-shaped connectors encircling a portion of the coolant supply system and fixed to the horizontal portion of the third mounting bracket.

8. The electric vehicle of claim 1, wherein the coolant supply system comprises first and second branching lines arranged in parallel to the rigid axle housing, wherein the first and second branching lines are rigidly fixed to the rigid axle housing by the second mounting bracket.

9. The electric vehicle of claim 8, wherein the coolant supply system further comprises first and second flexible hoses that are rigidly fixed to the third mounting bracket.

10. The electric vehicle of claim 9, wherein the coolant supply system further comprises first and second manifolds, wherein the first and second flexible hoses respectively couple the first and second branching lines to the first and second manifolds.

11. The electric vehicle of claim 1, wherein the coolant inlet includes a first coolant inlet arranged proximate to the first electric motor and a second coolant inlet arranged proximate to the second electric motor, and the coolant outlet includes a first coolant outlet arranged proximate to the first electric motor and a second coolant outlet arranged proximate to the second electric motor.

12. A method for installing a coolant supply system in an electric vehicle, the method comprising:

coupling the coolant supply system to a radiator and a rigid axle housing of the vehicle so that the coolant supply system is configured to supply coolant from the radiator to a coolant inlet of the rigid axle housing and to supply used coolant from a coolant outlet of the rigid axle housing to the radiator;

fixing a first mounting bracket to the chassis and the coolant supply system;

fixing a second mounting bracket to the rigid axle housing and the coolant supply system; and fixing a third mounting bracket to a suspension system control arm and the coolant supply system.

13. The method of claim 12, wherein the control arm has first and second control arms, the third mounting bracket is t-shaped with a vertical portion connected to the coolant supply system and to a horizontal portion, the method further comprising:

rigidly fixing the horizontal portion of the third mounting bracket to the first and second control arms;

fixing first and second loop-shaped connectors to the horizontal portion of the third mounting bracket; and encircling a portion of coolant supply system with the first and second loop-shaped connectors on a portion of the coolant supply system.

* * * * *